United States Patent

Di Felice

[15] 3,667,116

[45] June 6, 1972

[54] METHOD OF MANUFACTURING ZENER DIODES HAVING IMPROVED CHARACTERISTICS

[72] Inventor: Avio Di Felice, 43 Mount Hood Terrace, Melrose, Mass. 02176

[22] Filed: May 15, 1969

[21] Appl. No.: 825,025

Related U.S. Application Data

[63] Continuation-in-part of Ser. No. 539,753, Apr. 4, 1966, abandoned.

[52] U.S. Cl. ..................................29/574, 29/584, 250/49.5

[51] Int. Cl. ..........................................B01j 17/00, H01l 7/00

[58] Field of Search ................29/574, 576 B, 584, 585, 586; 250/49.5 R

[56] References Cited

UNITED STATES PATENTS

| | | | |
|---|---|---|---|
| 2,750,541 | 6/1956 | Ohl | 29/576 |
| 2,786,880 | 3/1957 | McKay | 29/576 |
| 2,817,613 | 12/1957 | Mueller | 29/576 |
| 2,919,389 | 12/1959 | Heywang et al. | 29/576 |
| 3,206,336 | 9/1965 | Hora | 148/1.5 |
| 3,293,084 | 12/1966 | McCaldin | 148/1.5 |

*Primary Examiner*—John F. Campbell
*Assistant Examiner*—W. Tupman
*Attorney*—Donald C. Keaveney and Alfred B. Levine

[57] ABSTRACT

A method of manufacturing zener diodes comprising the steps of sequentially forming and packaging a plurality of diodes, thereafter measuring the knee impedances of the diodes and irradiating those which have knee impedances exceeding a specified value with a high energy electron beam approximating the energy levels of beta radiation.

3 Claims, No Drawings

METHOD OF MANUFACTURING ZENER DIODES HAVING IMPROVED CHARACTERISTICS

RELATED APPLICATION

This application is a continuation-in-part of U.S. Pat. application Ser. No. 539,753 filed Apr. 4, 1966, now abandoned by the inventor herein and entitled "Method of Improving Characteristics of Zener Diodes."

BACKGROUND OF THE INVENTION

Zener diodes are semiconductor diodes which have an avalanche breakdown at a desired voltage so as to provide a current at a desired fixed voltage. The construction of a zener diode is well known in the art and in general comprises a body of a semiconductor material, such as silicon, having a sharp, shallow p-n junction therein. The bulk resistivity of the body determines the breakdown voltage of the zener diode. The diodes have terminals connected to opposite sides of the p-n junction and are generally enclosed in a protective housing. Zener diodes are used as voltage regulators to provide a current of a desired voltage.

An improtant characteristic of a zener diode is its impedance measured in ohms. Generally, the impedance of a zener diode is measured at two points; one being the operating point with a large DC current flowing; and the other being the knee joint near the avalanche breakdown with a small DC current flowing. The knee impedance is the most critical of the two impedances and it is desirable that the knee impedance be as low as possible. Industrial and military standard specifications set forth the maximum permissable knee impedance depending on the voltage rating of the zener diode.

In the mass production of zener diodes, it is the general practice to measure many of the electrical characteristics, including the knee impedance of the diodes after the diode element is completely assembled in its housing. If the knee impedance of the zener diode is not below the maximum set by the specifications to which the diode is being made, the diode is a reject and must be discarded. The more rejects there are that must be discarded, the greater the cost is of the remaining satisfactory diodes. Also, the lower the knee impedance of the zener diodes being manufactured, the higher the quality of the units being obtained. Therefore, to obtain high quality zener diodes with a minimum number of rejects, it would be desirable to be able to treat the zener diodes after they are assembled to lower the knee impedance of the diodes.

It is an object of the present invention to provide a novel method of improving the electrical characteristics of a zener diode.

It is another object of the present invention to provide a method of treating a zener diode to improve the knee impedance of the diodes.

It is still another object of the present invention to provide a method of treating a zener diode after it has been completely assembled to improve the knee impedance of the diode.

Other objects will appear hereinafter.

PREFERRED EMBODIMENT

The invention accordingly comprises the several steps and the relation of one or more of such steps with respect to each of the other thereof, which will be exemplified in the method hereinafter disclosed, and the scope of the invention will be indicated in the claims.

I have discovered that by subjecting zener diodes to a high energy electron beam having energy approximately that of beta irradiation, the knee impedance of the zener diodes is greatly reduced. This effect is achieved by a dosage of electron beam or beta irradiation of between 5 megarads and 40 megarads. A dosage of less than 5 megarads has little, if any, effect on the knee impedance of the zener diode, and a dosage of greater than 40 megarads will adversely affect the other characteristics of the zener diode. A major advantage of this method of treating the zener diodes is that it can be carried out after the zener diode is completely assembled within its housing. Therefore, in the mass production of zener diodes, after the zener diodes have been completely assembled and finally tested, those zener diodes which have too high a knee impedance can be treated by beta irradiation according to the method of the present invention so as to reduce the knee impedance to an acceptable value. Thus, by the method of the present invention, a larger yield of commercially acceptable zener diodes can be obtained. Also, by the treatment of the present invention, the knee impedance of all the zener diodes being processed can be reduced so as to achieve higher quality zener diodes.

The amount of beta irradiation necessary to achieve a desired reduction in the knee impedance of a zener diode varies with the size of the zener diode and its knee impedance prior to treatment. However, this can be easily determined by subjecting the zener diode to a minimum dosage and then measuring its knee impedance to determine the reduction in its knee impedance. From this information, the dosage necessary to achieve any desired additional reduction in the knee impedance of the zener diode can be obtained. The method of the present invention can be carried out using any commercially available apparatus which generates beta irradiation. Such apparatus is generally a Vandergraff accelerator. One preferred type of accelerator used in the examples described below was a High Voltage Engineering 3 M.e.v. machine set up with a beam current of $750 \times 10^{-6}$ amps, scan width of 22.5 inches, conveyor velocity of 93 inches/minute, and an irradiation dose per pass of one-half megarad, 36 passes providing a total dose of 18 megarads. In general a minimum voltage level of one-half M.e.v. is necessary to penetrate both the package and the device.

For a generally accepted definition of the energy ranges involved in beta radiation, reference is made to a textbook entitled "Nuclear Physics" by Dr. Alex E. S. Green (published by McGraw Hill 1955) which, in table 1—1 indicates that beta rays are essentially electrons having kinetic energies in the range of approximately 0.1 to 10 M.e.v.

The following examples are given to illustrate the effectiveness of the method of the present invention, it being understood that the details of the examples are not to be taken as in any way limiting the invention thereto.

EXAMPLE I

For this test 300 zener diodes of 1 watt, 24 volt size were used. The zener diodes were taken off a standard production line and comprised a silicon zener diode element sealed in a metal housing with the anode terminal extending through a glass seal at one end of the housing. The 300 zener diodes were tested by standard techniques to determine whether their electrical characteristics, including knee impedance, met the commercial standards for this size zener diode. The results of the testing showed that of the 300 zener diodes only 108 had an acceptable knee impedance for a yield of 36 percent.

The 300 zener diodes were then subjected to beta irradiation in accordance with the method of the present invention. Each zener diode was given a dosage of 18 megarads with the anode side of the zener diode element being exposed to the irradiation beam through the glass seal of the housing. After irradiation, the knee impedance of the 300 zener diodes was again tested. The test results showed that of the 300 zener diodes subjected to the beta irradiation 297 now had an acceptable knee impedance for a yield of 99 percent.

EXAMPLE II

For this test 284 zener diodes of a 1 watt, 27 volt size were used. The zener diodes were taken off a standard production line and were of the same general construction as the zener diodes of Example I. The 284 zener diodes were tested by standard techniques to determine their electrical characteristics, including knee impedance. Of the 284 zener diodes only 110 had an acceptable knee impedance to meet the standard commercial qualifications for a yield of 38.7 percent.

The 284 zener diodes were then subjected to beta irradiation in the same manner as described in Example I. After irradiation the knee impedance of the 284 zener diodes was again tested. The test results showed that of the 284 zener diodes subjected to the beta irradiation, 279 now had an acceptable knee impedance for a yield of 98 percent.

From the tests described in the above Examples, it can be seen that by the use of the method of the present invention, the knee impedance of completely assembled zener diodes can be reduced to improve the yield of acceptable zener diodes. To insure that the effect produced by the method of the present invention is permanent, the zener diodes tested in Examples I and II were stored at a temperature of 200° for one week. Upon retesting such zener diodes, it was found that there was no change in the knee impedances of the diodes. Thus, the method of the present invention produces a reduction in the knee impedance of the zener diodes which is permanent.

It will thus be seen that the objects set forth above, among those made apparent from the preceding description, are efficiently attained and, since certain changes may be made in carrying out the above method without departing from the scope of the invention, it is intended that all matter contained in the above description should be interpreted as illustrative and not in a limiting sense.

What I claim is:

1. A method of manufacturing a plurality of zener diodes comprising the steps of:

a. forming a plurality of zener diodes, each of said diodes being mounted in a package;

b. measuring the knee impedance of said packaged diodes to determine which of them have knee impedances exceeding a specified value; and c. thereafter irradiating the diodes which have knee impedances exceeding said specified value with an electron beam to provide an energy dosage of between 5 and 40 megarads of radiation to reduce said knee impedance.

2. The method as in claim 1. in which the radiation is applied to the anode of the zener diode through said package.

3. The method as in claim 1. in which the radiation is applied at a voltage level of at least one-half M.e.v.

* * * * *